(12) United States Patent
Sihler et al.

(10) Patent No.: US 8,004,252 B2
(45) Date of Patent: Aug. 23, 2011

(54) POWER SYSTEM STABILIZER AND METHOD

(75) Inventors: Christof Martin Sihler, Hallbergnoos (DE); Alfredo Sebastian Achilles, Augsburg (DE); Simon Herbert Schramm, Munich (DE)

(73) Assignee: General Electric Company, Niskayuna, NY (US)

( * ) Notice: Subject to any disclaimer, the term of this patent is extended or adjusted under 35 U.S.C. 154(b) by 809 days.

(21) Appl. No.: 11/770,827

(22) Filed: Jun. 29, 2007

(65) Prior Publication Data

US 2009/0001940 A1 Jan. 1, 2009

(51) Int. Cl.
*H20P 11/00* (2006.01)
(52) U.S. Cl. ............... 322/58; 322/25; 322/29; 322/19; 322/28
(58) Field of Classification Search .............. 322/19, 322/25, 29, 32, 58, 28
See application file for complete search history.

(56) References Cited

U.S. PATENT DOCUMENTS

| | | | | |
|---|---|---|---|---|
| 3,999,115 | A * | 12/1976 | South et al. | 322/25 |
| 5,198,745 | A | 3/1993 | Larsen et al. | |
| 5,233,286 | A * | 8/1993 | Rozman et al. | 322/90 |
| 7,035,124 | B2 * | 4/2006 | Chadwick et al. | 363/40 |
| 7,173,399 | B2 | 2/2007 | Sihler et al. | |
| 7,423,411 | B2 * | 9/2008 | Sihler | 322/19 |

OTHER PUBLICATIONS http://www.pge.com/includes/docs/pdfs/biz/transmission_services/contracts_tariffs/wi_handbook/, Handbook, Sep. 20, 2004.

* cited by examiner

*Primary Examiner* — T C Patel
*Assistant Examiner* — Iraj A Mohandesi
(74) *Attorney, Agent, or Firm* — Ann M. Agosti

(57) ABSTRACT

A power system stabilizer includes: a sensor configured for sensing a signal representative of electromechanical oscillations of the power system; a controller configured for using the sensed signal for generating control signals for damping the electromechanical oscillations; and a damper including a damping converter and a resistor coupled to the damping converter, the damping converter being coupled to the power system through a power bus, the damping converter configured for using the control signals for damping the electromechanical oscillations.

19 Claims, 10 Drawing Sheets

POWER SYSTEM STABILIZER AND METHOD

BACKGROUND

The subject matter disclosed herein relates generally to power system stabilization.

When a power system has a connection to a large utility network with many gigawatts of generated power, any individual electrical load on the power system will typically have only a negligible effect. In contrast, island power systems have no connection to a large utility network and island-like power systems have only a weak connection to a utility network (such as by means of a long transmission line with a comparably high impedance). Island and island-like power systems are commonly used in the marine industry (for example, onboard power systems of large ships), isolated on-shore installations, and the oil and gas industry. In such power systems, the balance between the power generated and the loads connected is more difficult to control, and voltage and frequency fluctuations are more frequently observed.

Disturbances in island and island-like power systems can cause instabilities that may lead to a system shutdown. Stabilizing measures or controls are used to improve system performance upon an occurrence of such disturbances. Types of such stabilizing measures or controls include transient stabilizers (such as fast acting switched braking resistors, mechanical power reduction systems, and intentional generation disconnection systems), dynamic stabilizers (such as variable conductance elements and control devices to modulate field voltage of synchronous generators), and combinations thereof. Transient stabilizers are used under (or after) fault conditions such as short circuits wherein the angular speed of one or more machines may increase with respect to the rest of machines in the system and thus cause a loss of synchronism. Dynamic stabilizers are used to address small signal problems that can be excited with disturbances related to switching operations during normal or contingency operation.

Under conventional approaches, when switched braking resistors are used, the dissipated power is difficult to control, and dynamic stability support is thus hard to achieve. Additionally, high voltage components (with nominal voltages greater than 1 kilovolt, for example) are used.

When dynamic stability improvement is attempted via generator excitation control, transient stability performance is often not noticeably enhanced.

A variable conductance, such as a dynamic braking resistor, is sometimes used for stabilizing a power system after a disturbance. Dynamic braking resistors typically comprise anti-parallel thyristors directly coupled to a power system busbar or coupled via a transformer. These approaches require damping power that is commonly achieved by embodiments including high-voltage devices.

It would be desirable to have a power system stabilizer suited for island and island-like power systems and capable of providing both transient and dynamic stability.

BRIEF DESCRIPTION

Commonly Assigned U.S. application Ser. No. 11/381,900 is directed to a resistive torsional mode damping system and method (RTMD). An RTMD system uses controllable resistive modules for solving problems with torsional vibrations in drive train applications. It would be useful to have a similar capability (without the need for high voltage devices) in power system stabilization applications for power systems with nominal voltage requirements such as oil and gas drilling systems and wind farms.

Briefly, in accordance with one embodiment disclosed herein, a power system stabilizer comprises: a sensor configured for sensing a signal representative of electromechanical oscillations of the power system; a controller configured for using the sensed signal for generating control signals for damping the electromechanical oscillations; and a damper comprising a damping converter and a resistor coupled to the damping converter, the damping converter being coupled to the power system through a power bus and being configured for using the control signals for damping the electromechanical oscillations.

In accordance with another embodiment disclosed herein, a method of stabilizing an island or island-like power system comprises: sensing a signal representative of electromechanical oscillations of the power system; using the sensed signal for generating control signals for damping the electromechanical oscillations; and providing the control signals to a damper comprising a damping converter and a resistor coupled to the damping converter, wherein the damping converter is coupled to the power system through a power bus.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
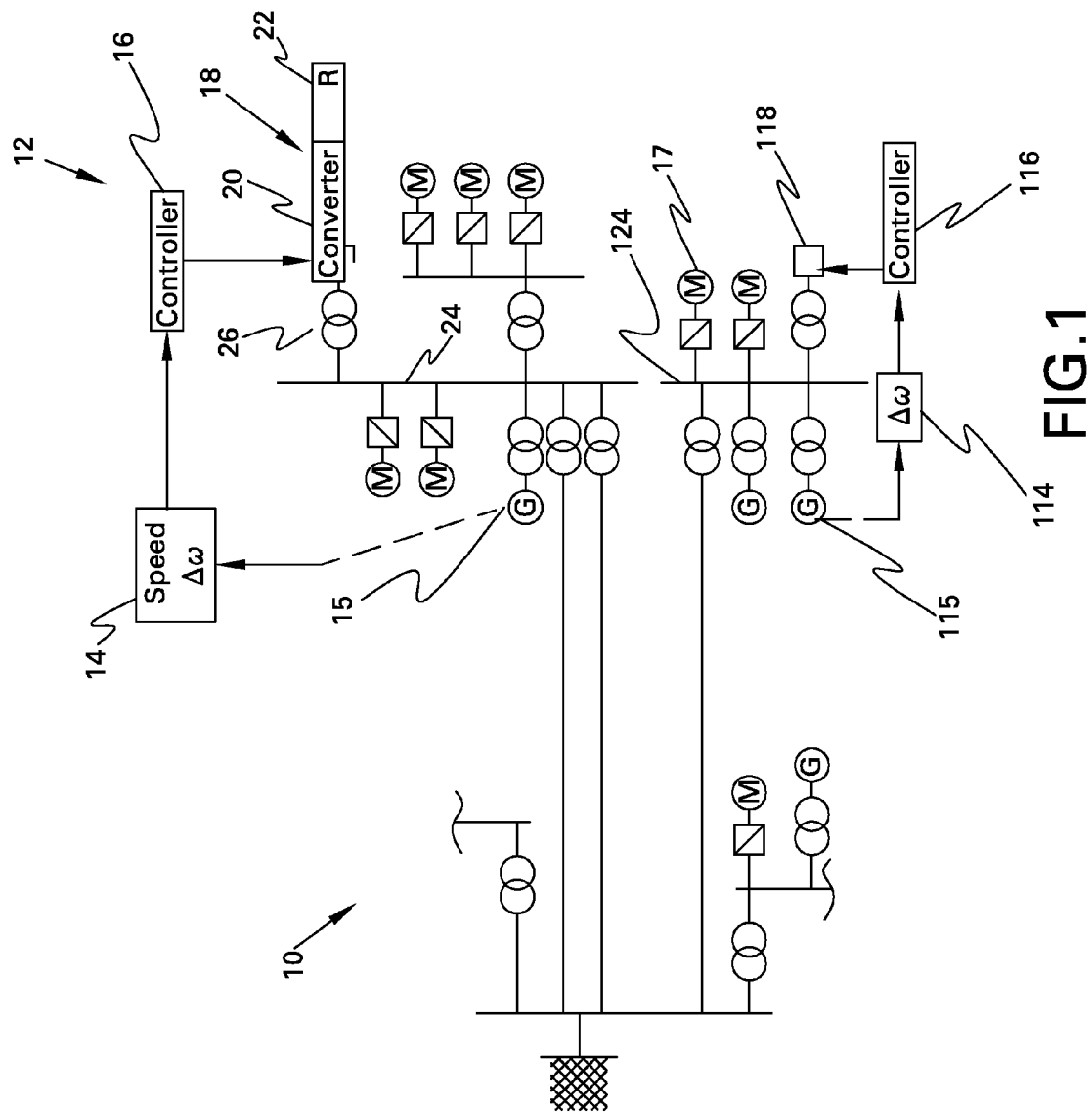
FIG. 1 is a schematic diagram of a power system stabilizer in accordance with one embodiment disclosed herein.

FIG. 1 is a schematic diagram of a power system 10 and stabilizer 12 of one embodiment disclosed herein wherein a power system 10 stabilizer 12 comprises: a sensor 14 configured for sensing a signal representative of electro-mechanical oscillations of power system 10; a controller 16 configured for using the sensed signal for generating control signals for damping the electromechanical oscillations; and a damper 18 comprising a damping converter 20 and a resistor 22 coupled to damping converter 20. Damping converter 20 is coupled to power system 10 through a power bus 24 and is configured for using the control signals for damping the electromechanical oscillations.

Damping converter 10 may comprise any suitable controllable power conversion module with several examples including thyristor, IGBT (insulated gate bipolar transistor), and IGCT (integrated gate commutated thyristor) bridges. Damper 18 is expected to be most useful when embodied within island or island-like power systems. In a more specific embodiment, power system 10 comprises a power system configured for providing power to an assembly for industrial power systems such as systems for obtaining oil, gas, or combinations thereof, for example. In an alternate embodiment, power system 10 comprises a wind turbine.

Resistor 22 may comprise any appropriate type of resistor with several examples including steel resistors and water resistors. If desired, conventional cooling embodiments may be applied to assist in heat dissipation.

"Controller" or "control" as used herein is meant to encompass any appropriate analog, digital, or combinations of analog and digital circuitry or processing units used to accomplish the designated control function. In one embodiment, controller 16 is configured for, during normal operation, generating control signals for damping the electromechanical oscillations, and, during transient operation, generating control signals for providing electromechanical braking. In a more specific embodiment, the system is configured to provide a level of modulation of less than or equal to 10 Hz (or more specifically in the range of 0.1 Hz to 3 Hz). In this modulation range, a resistor is useful because an inductive element of reasonable size cannot itself readily provide the damping power. As described below with respect to FIG. 3, a filter element such as an inductor may be used in combination with the resistor, however.

In one example, the signal representative of electromechanical oscillations comprises an angular speed of one or more generators 15 and 115 coupled to one or more bus bars 24 and 124. If angular speed of generator 15 increases (or decreases) at a higher rate than a threshold rate, for example, modulation to provide more current to (or less current to) the at least one resistor may be used to counteract potential stability issues with the level of modulation being proportionate to the level of increase or decrease in rate of change of the angular speed.

Angular speed sensors are useful because such sensors are often already present on generators. Other sensors may be used however with one example including frequency sensors (not shown) coupled to busbars 24, 124 and controllers 16, 116 configured to detect changing frequencies. Several other examples of sensors include a voltage sensor to differentiate between electrical faults and system frequency events such as generator trips, a power sensor to adapt thresholds of stabilizing device operation for transient stability depending on machine operation point, and a power sensor for machine power output to detect electromechanical oscillations.

Angular speed and frequency parameters and their rates of change are useful parameters to observe because systems are generally operated to keep angular speed and frequency within a limited band. Although thresholds vary according to utility network or industrial power system requirements as well as generating unit characteristics, for many power systems, if the rate of change of frequency is greater than about two percent per second, a fault can be assumed and the stabilizing device could start transient stability support. The rate of change threshold can also be set to be proportional to the active power output of the monitored generator 15.

Modulation of the current through resistor 22 is done based on the feedback signal from sensor 14. If controller 16 detects a stability problem, then controller 16 activates the stabilizer and proportionally increases the current in the resistor at the same frequency to counterbalance the variations in the sensed signal.

FIG. 1 illustrates an embodiment wherein multiple sets of sensors 14, 114, controllers 16, 116, and dampers 18, 118 are used. It is believed to be useful but not required to have at least one sensor 14, 114 per busbar 24, 124 and to locate the sensors in proximity to the power generating units 15, 115. This embodiment is particularly useful for distributed power systems where the various busbars are not coupled together because different bus bars may react differently to system disturbances.

When working with multiple sensors and controllers, to prevent over-heating of resistors under conditions wherein no disturbance is occurring (steady state conditions), careful selection of the thresholds and signal filtering may be useful. For example, in one embodiment, the controller generates damping control signals only upon an angular speed deviation in a frequency range 1-15 Hz of a starting threshold of at least one percent (or in a more specific embodiment of at least two percent). In an even more specific embodiment an ending threshold is additionally used. For example, in one embodiment a controller will continue to generate damping control signals until the angular speed deviation drops to a lower percentage, such as 0.5%, for example.

In one example, generator 15 comprises a generator with a low moment of inertia like an aeroderivative gas-turbine driven generator. In another example, generator 15 comprises a wind turbine generator or, in a more specific embodiment, a direct drive wind turbine generator. Additionally or alternatively, a sensor may be coupled to a motor 17 with such embodiments being particularly useful for motors operating in remote environments such as off shore oil and gas drilling.

Figure 2:
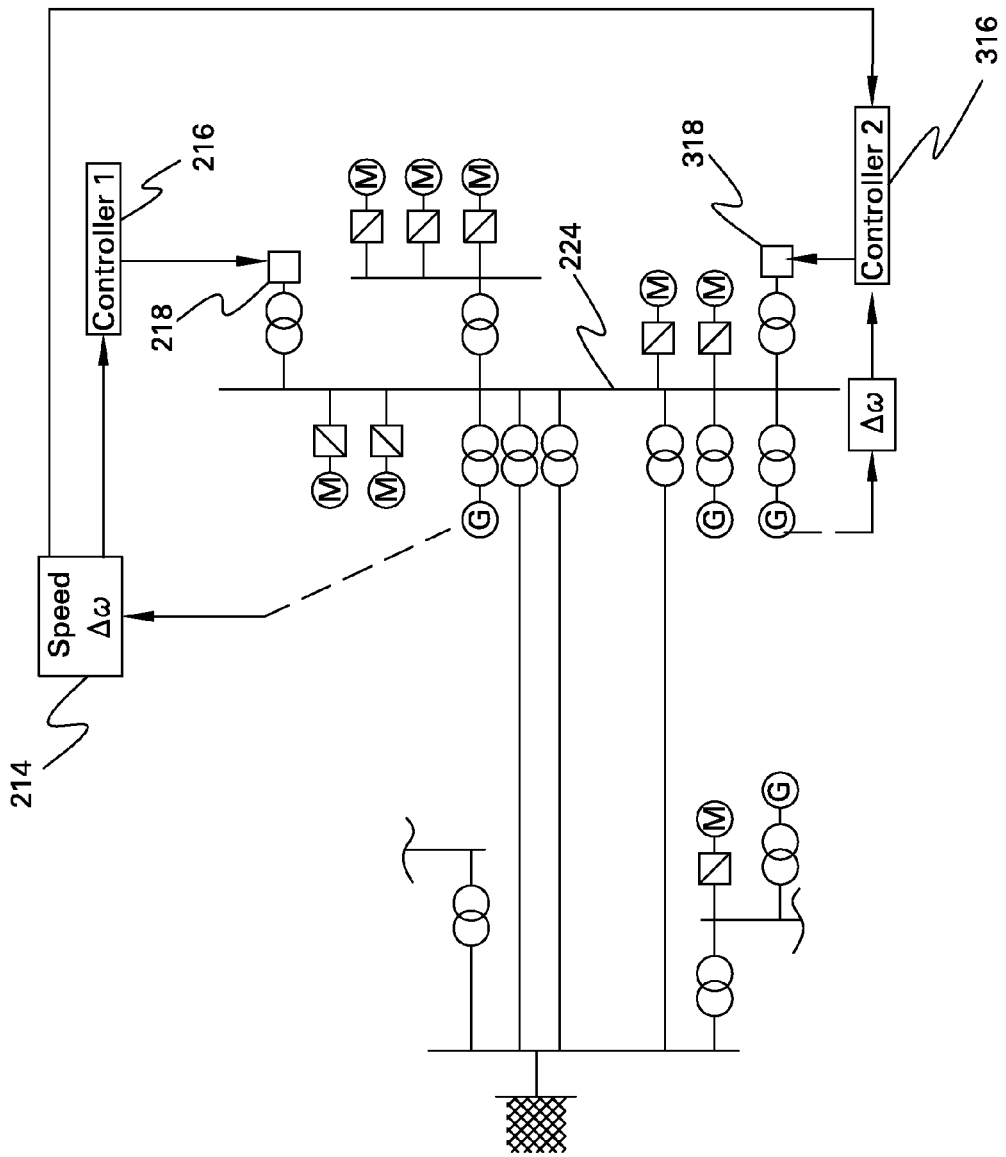
FIG. 2 is a schematic diagram of a power system stabilizer in accordance with another embodiment disclosed herein.

FIG. 2 is a schematic diagram of a power system stabilizer in accordance with another embodiment disclosed herein wherein one sensor 214 is used for controlling multiple dampers 218, 318 via one or more controllers 216, 316. Although two controllers are shown, the functionality may be embodied in one or more processing units. The single sensor, multiple damper embodiment of FIG. 2 is expected to be useful in embodiments with a single bus bar 224 and may be even more applicable in embodiments wherein each generator is expected to exhibit common dynamic behavior.

Figure 3:
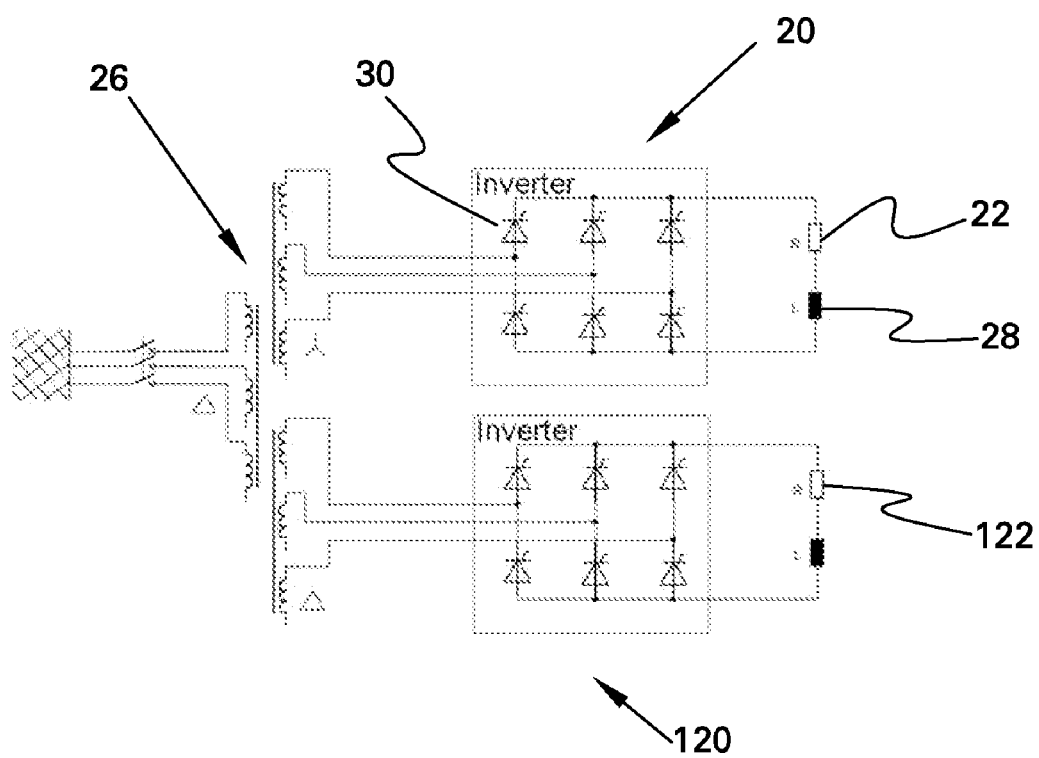
FIG. 3 is a schematic diagram of a power system stabilizer in accordance with another embodiment disclosed herein.

FIG. 3 is a schematic diagram of a power system stabilizer in accordance with another embodiment wherein damping converter 20 comprises an alternating current to direct current thyristor 30 rectifier. More specifically, in the embodiment of FIG. 3, the damper comprises at least two damping converters 20, 120 with each damping converter being coupled to a respective resistor 22, 122. Embodiments with multiple converters and resistors provide more flexibility in selecting components and more redundancy. In an even more specific embodiment intended to reduce harmonic distortion, as shown in FIG. 3, a transformer 26 is configured for coupling the damping converters to the power bus with at least one of the damping converters 20 being coupled to the transformer in a wye configuration and at least one other of the damping converters 120 being coupled to the transformers in a delta configuration.

FIG. 3 additionally illustrates an embodiment further including a filter element shown for purposes of example as inductance 28. In a more specific example, the filter element has an inductance value coupled in series to the resistor and in the range of one millihenry to 20 millihenry (or even more specifically in the range of one millihenry to five millihenry).

Figure 4:
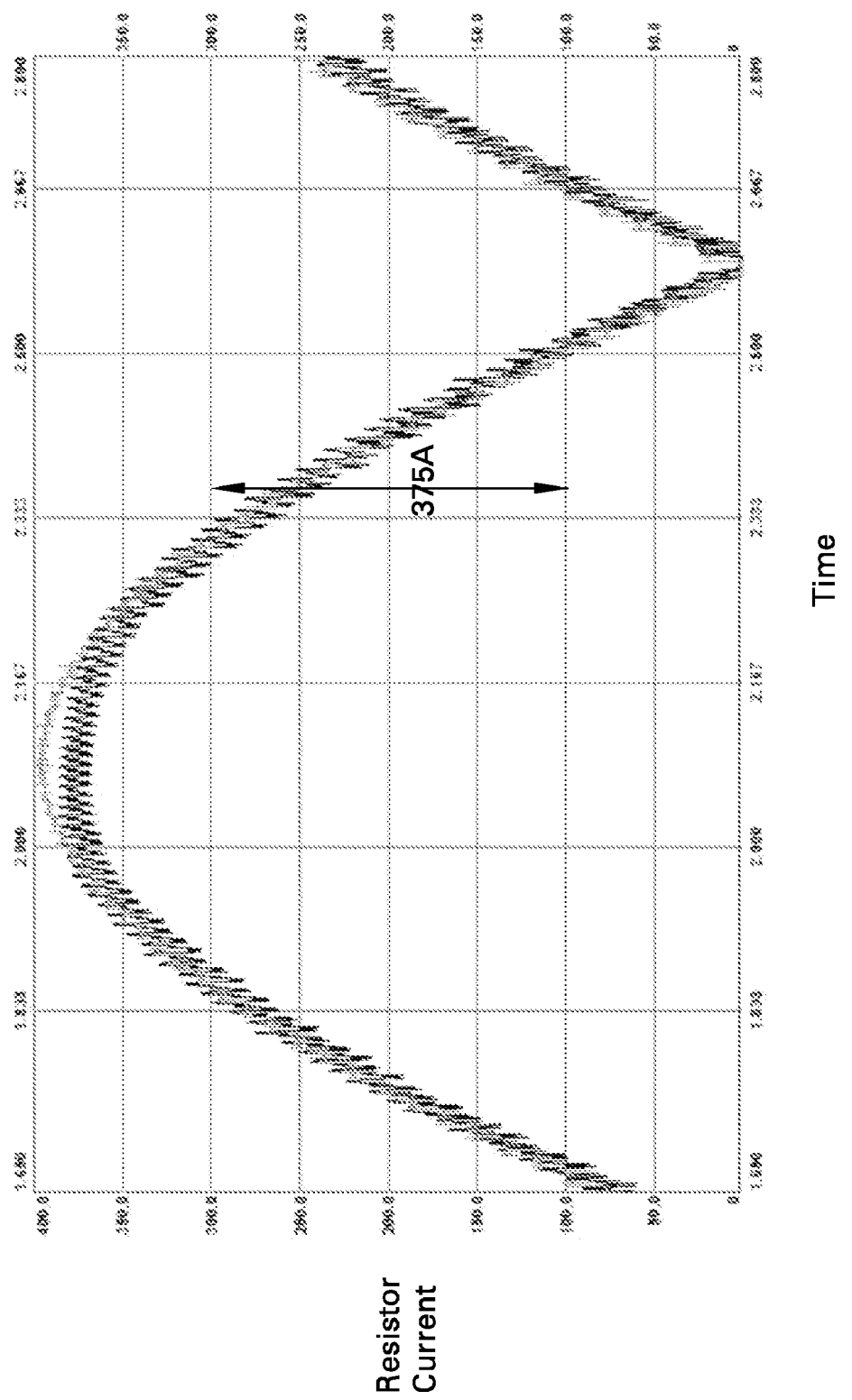
FIG. 4 is a simulated graph related to the embodiment of FIG. 3 and illustrating resistor current over time.
Figure 5:
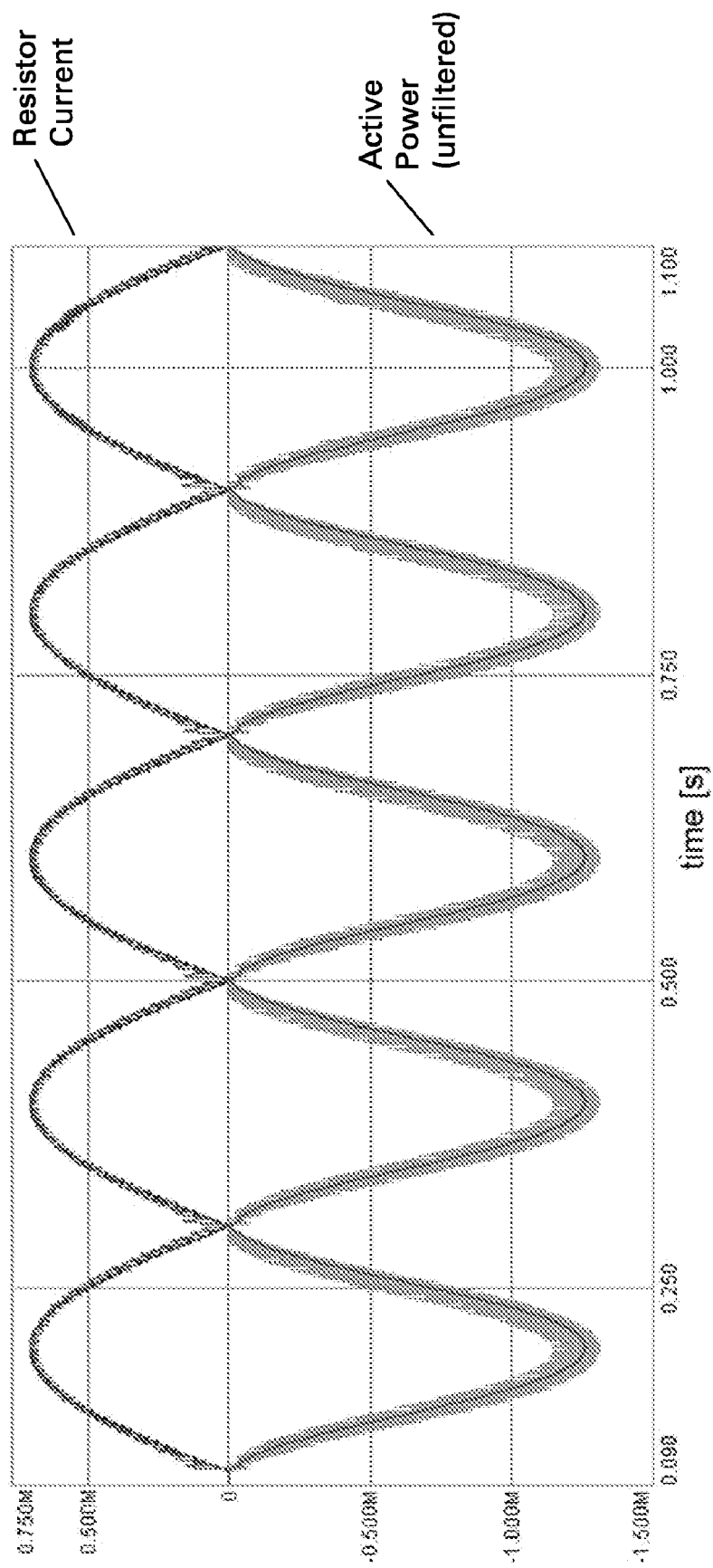
FIG. 5 is a simulated graph related to the embodiment of FIG. 3 and illustrating resistor current and unfiltered active power over time.

FIG. 4 is a simulated graph related to the embodiment of FIG. 3 and illustrating resistor current over time, and FIG. 5 is a simulated graph related to the embodiment of FIG. 3 and illustrating resistor current and unfiltered active power over time. To counter the electromechanical oscillations of power system 10, thyristors 30 may be switched in a controlled manner using a square function to provide an approximated counter oscillating sine wave.

Figure 6:
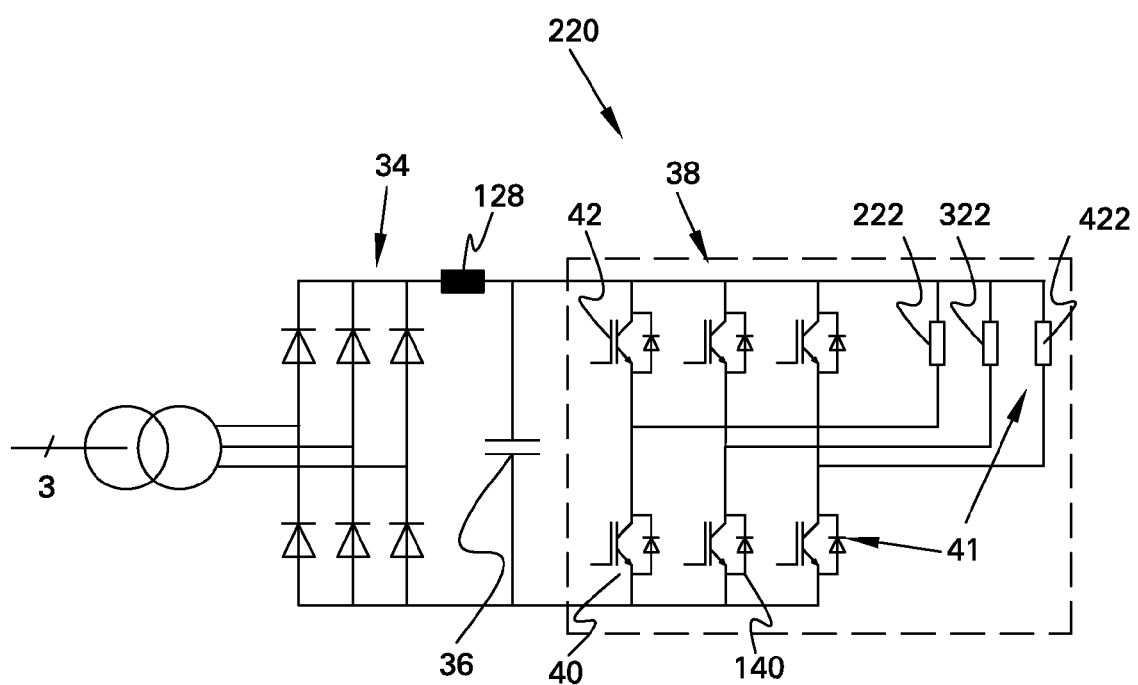
FIG. 6 is a schematic diagram of a power system stabilizer in accordance with another embodiment disclosed herein.

FIG. 6 is a schematic diagram of a power system stabilizer in accordance with another embodiment disclosed herein wherein damping converter 220 comprises a diode rectifier 34 coupled in parallel to a capacitor 36 which in turn is coupled to an IGBT module 38.

IGBT embodiments require more components than thyristor (line commutated) embodiments but offer an advantage of being self-commutated and thus working well even under network fault conditions. More specifically, IGBTs enable voltage ride-through capability (meaning delivery of needed damping power even if grid voltage drops below fifty percent for example) as well as damping capability in the case of asymmetrical grid faults. Thus, this embodiment may be used to increase tolerance for (or robustness under) power system faults.

FIG. 6 illustrates an IGBT module embodiment with three pairs of IGBTs 40, 42 and with each pair of IGBTs being coupled in parallel to the other pairs. FIG. 6 further illustrates three resistors 222, 322, and 422 with each is coupled across one IGBT of a respective pair of IGBTs. Although this embodiment is convenient because six switch IGBT modules are commercially available, the illustration is for purposes of example only. Additionally, as used herein, "three," in the context of IGBTs and resistors, is meant to include at least three.

In the embodiment of FIG. 6, by switching the IGBTs 40 in the lower row with pulse width modulation, a sine wave can be approximated across each resistor. Although the upper IGBTs 42 need not be switched, these IGBTs are still useful due to their inherent freewheeling diode functionality. For embodiments without the top row of switches, freewheeling diode components are recommended. FIG. 6 additionally illustrates an inductance 128 which may be present between diode rectifier 34 and capacitor bank 36 for filtering.

Although three legs 41 of switches and resistors are illustrated, a single switch and resistor leg may be used if desired but will not offer as high a degree of control as multiple leg embodiments. For example, if two IGBTs 40 and 140 are switched simultaneously, a parallel coupling results with the effective resistance being halved when resistors of equal resistances are used.

In one embodiment for controlling the IGBT module of FIG. 6, if the actual grid speed or frequency corresponds to a nominal grid value within plus or minus a threshold percent (two percent in one example), only one resistor will be connected to the DC link at a given time. In order to thermally distribute the dumped energy between all resistors, the IGBTs may be switched subsequently (PWM or hysteresis controlled) for a defined period of time (such as 0.1 seconds for example). In order to provide full damping power, multiple IGBTs may be switched simultaneously to connect the resistors in parallel.

Figure 7:
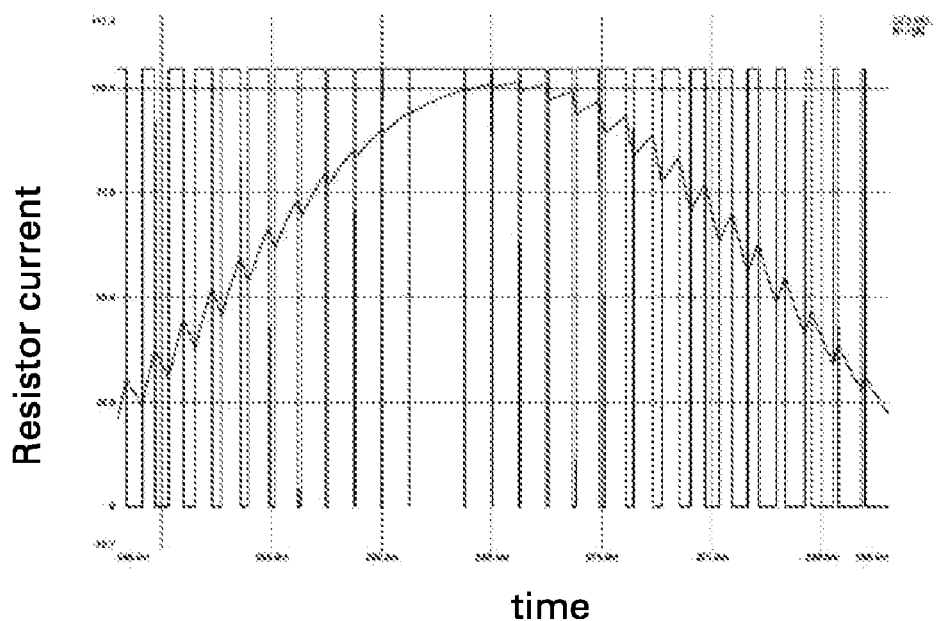
FIG. 7 is a simulated graph related to the embodiment of FIG. 6 and illustrates resistor current over time.
Figure 8:
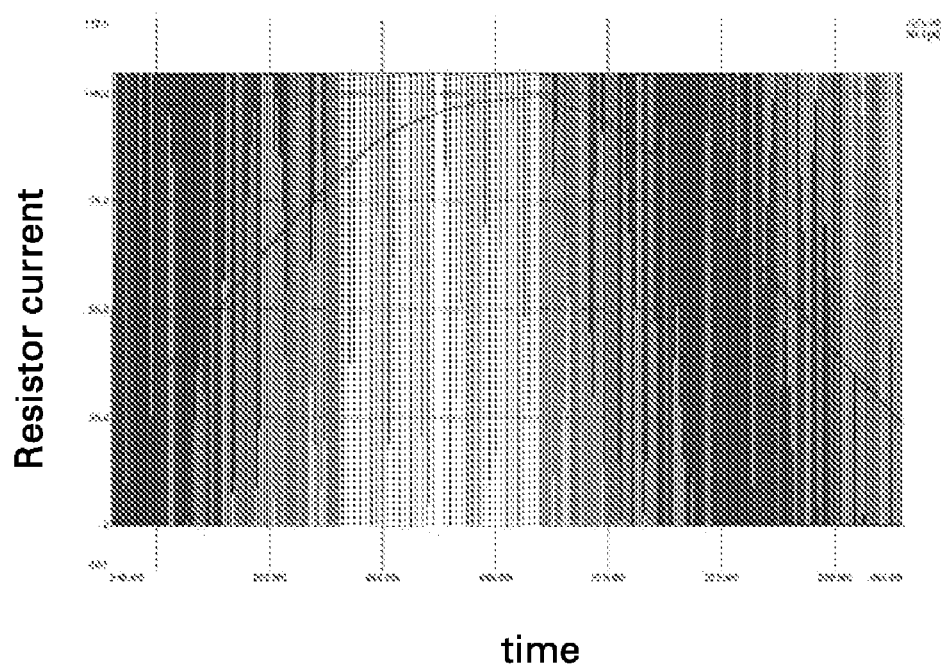
FIG. 8 is a simulated graph related to the embodiment of FIG. 6 and illustrates resistor current over time.

The current flow through a given resistor can be controlled in such a way that an active damping power comprising one frequency (or a range of frequencies) may be achieved to counteract low-frequency oscillations in the power system. FIGS. 7 and 8 are simulated graphs related to the embodiment of FIG. 6 and illustrate resistor current over time at different switching frequencies with the frequency for FIG. 7 being 800 Hz and the frequency for FIG. 8 being 8 kHz.

Figure 9:
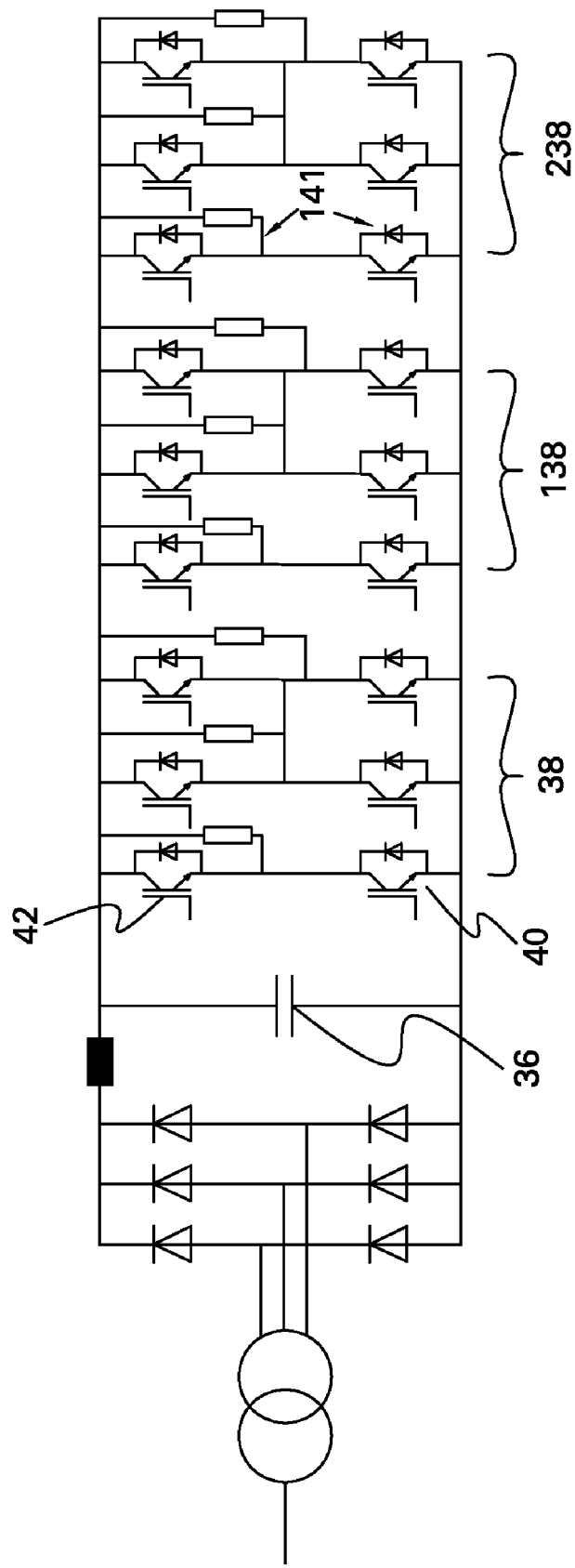
FIG. 9 is a schematic diagram of a power system stabilizer in accordance with another embodiment disclosed herein.

FIG. 9 is a schematic diagram of a power system stabilizer in accordance with another embodiment wherein the damping converter comprises at least two IGBT modules 38, 138, and 238 and provides even more flexibility than the embodiment of FIG. 6, particularly when at least some of the IGBT modules are coupled in parallel as shown. IGBTs of the at least two IGBT modules are selectively switched simultaneously or sequentially depending upon the sensed signals.

Coupling of modules permits less expensive components to be selected to achieve needed damping. In one example, each leg 141 has a power rating of no more than two MVAs (megavolt amperes). In a more specific example, each module has a power rating of no more than one MVA.

Figure 10:
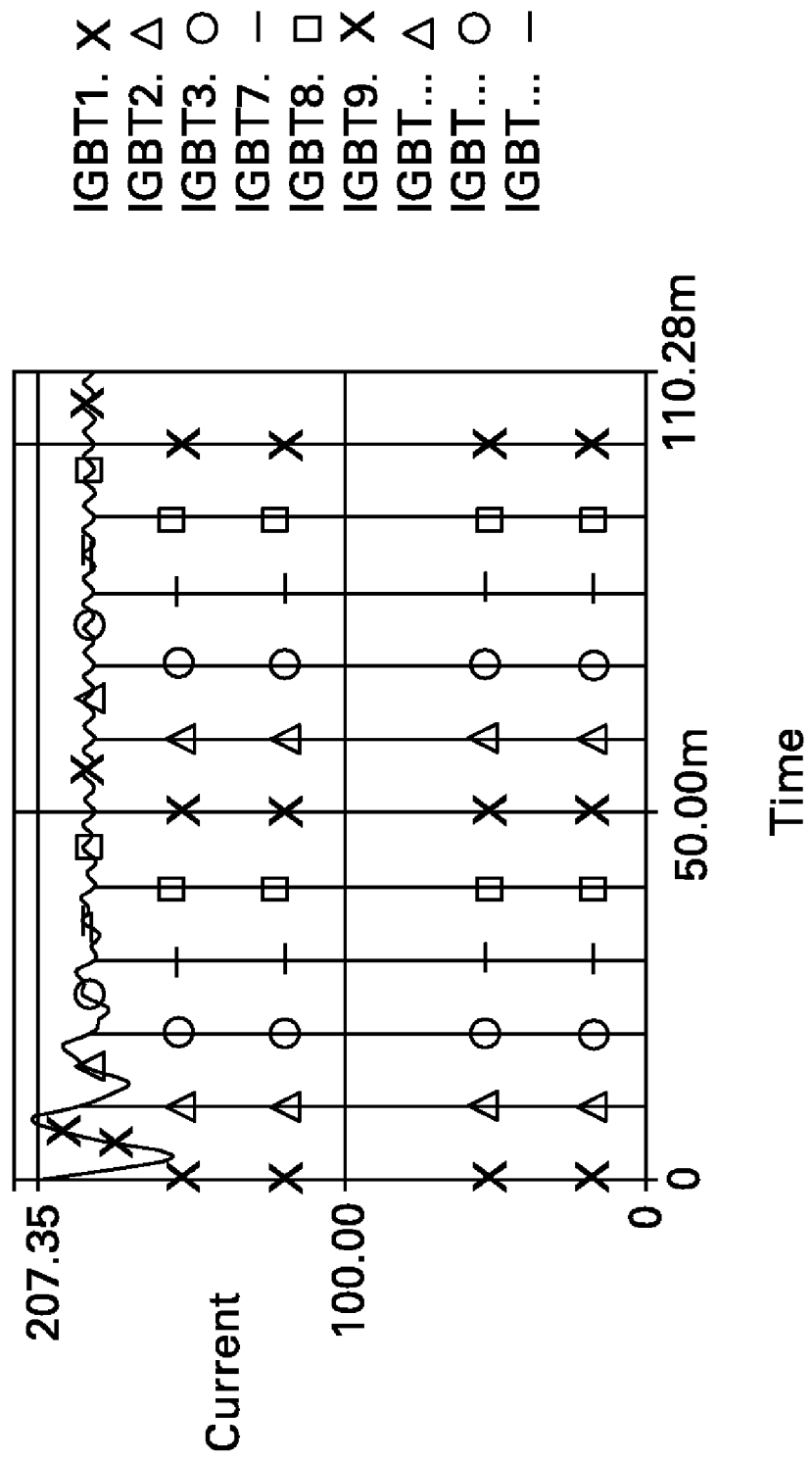
FIG. 10 is a simulated graph related to the embodiment of FIG. 9 and illustrates current over time with respect to the various switching devices of FIG. 9.

FIG. 10 is a simulated graph related to the embodiment of FIG. 9 under normal operation (dynamic stabilization) and illustrates current over time with respect to the various switching devices of FIG. 9 with one IGBT on the lower row being switched after the other and thus with the dumped energy being thermally distributed across the resistors.

Figure 11:
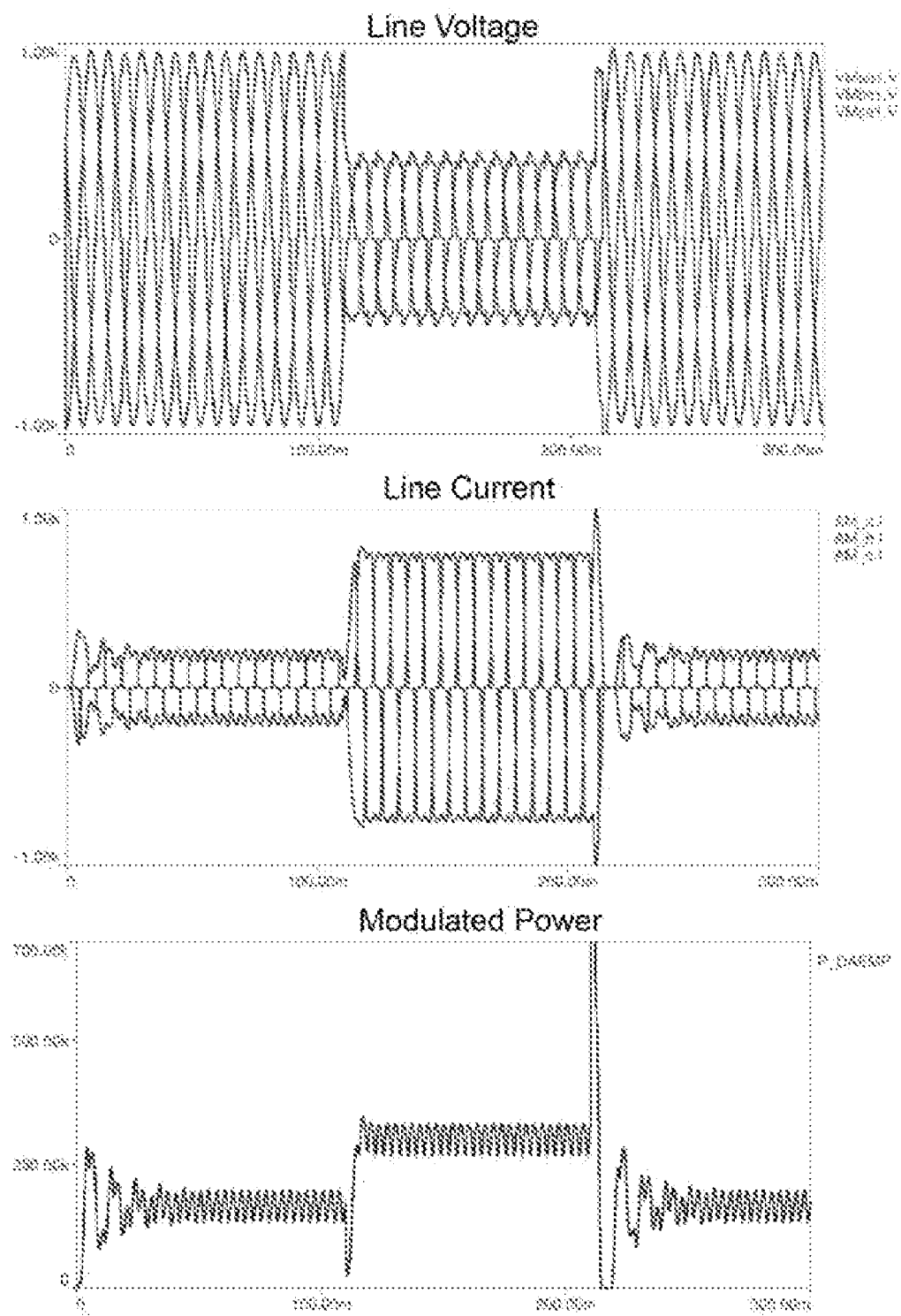
FIG. 11 is a set of simulated graphs related to the embodiment of FIG. 9 and illustrating line voltage, line current, and modulated power over time.

FIG. 11 is a set of simulated graphs related to the embodiment of FIG. 10 under voltage ride through conditions (transient stabilization) and illustrates line voltage, line current, and modulated power over time. As can be seen by the line graphs, at shortly after 100 ms, the actual line voltage (shown as "line voltage") drops to fifty percent of nominal. By switching all of the IGBTs of the three IGBT modules simultaneously, the damping current (shown as "line current") increases and thus damping power is still available (shown as "modulated power").

Embodiments disclosed herein may be used to provide both transient and dynamic stability and are power systems with limited nominal power. One or more standard low-voltage power conversion modules may be used with the number of modules required depending on the amount of power to be stabilized. Multiple module embodiments are expected to provide additional advantages such as scalability, redundancy, cost-effectiveness, and ride-through capability.

Another advantage of the embodiments disclosed herein is that the modular design enables the power system stabilizer to be installed as a distributed system (that is, by installing several sensor and damping resistors at different locations of the power system as shown. in FIG. 1). Distributed stabilizer systems can provide stability even if a short-circuit occurs at a busbar where one of the stabilizer modules is connected (in other words, when one stabilizer module is affected but not the others).

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power system stabilizer, the stabilizer comprising:
 a sensor configured for sensing a signal representative of electro-mechanical oscillations of a power system;
 a controller configured for using the sensed signal for generating control signals for damping the electro-mechanical oscillations; and
 a damper comprising a damping converter and a resistor coupled to the damping converter, the damping converter being coupled to the power system through a power bus, the damping converter configured for using the control signals for damping the electro-mechanical oscillations, wherein the control signals provide dynamic stability and transient stability of the power system by damping the electro-mechanical oscillations, wherein the damping converter comprises at least two insulated gate bipolar transistor (IGBT) modules, and wherein the controller is configured for selectively switching IGBTs of the at least two IGBT modules simultaneously or sequentially.

2. The stabilizer of claim 1 wherein the controller is configured for, during normal operation, generating control signals for damping the electro-mechanical oscillations, and, during transient operation, generating control signals for providing electro-mechanical braking through the damper.

3. The stabilizer of claim 2 wherein, during normal operation, the damper is configured to provide a level of modulation of less than or equal to 10 Hz.

4. The stabilizer of claim 2 wherein the resistor includes an inductance.

5. The stabilizer of claim 1 wherein the damping converter further comprises a diode rectifier coupled in parallel to a capacitor which in turn is coupled to the at least two IGBT modules.

6. The stabilizer of claim 5 wherein each of the at least two IGBT modules comprises three pairs of IGBTs with each pair of IGBTs being coupled in parallel to the other pairs.

7. The stabilizer of claim 6 wherein the resistor comprises a plurality of resistors, and wherein each resistor is coupled across one IGBT of a respective pair of IGBTs.

8. The stabilizer of claim 5 wherein the stabilizer is further configured for providing voltage ride-through capability.

9. The stabilizer of claim 1 wherein at least some of the at least two IGBT modules are coupled in parallel.

10. The stabilizer of claim 1 wherein each module has a power rating of no more than two MVA.

11. The stabilizer of claim 1, wherein the damper is embodied within an island or island-like power system.

12. A power system comprising
a power system stabilizer, the stabilizer comprising:
a sensor configured for sensing a signal representative of electro-mechanical oscillations of the power system;
a controller configured for using the sensed signal for generating control signals for damping the electro-mechanical oscillations; and
a damper comprising a damping converter and a resistor coupled to the damping converter, the damping converter being coupled to the power system through a power bus, the damping converter configured for using the control signals for damping the electro-mechanical oscillations, wherein the control signals provide dynamic stability and transient stability of the power system by damping the electro-mechanical oscillations, wherein the damping converter comprises at least two insulated gate bipolar transistor (IGBT) modules, and wherein the controller is configured for selectively switching IGBTs of the at least two IGBT modules simultaneously or sequentially.

13. The power system of claim 12, wherein the power system comprises a power system configured for providing power to an assembly for obtaining oil, gas, or combinations thereof.

14. The power system of claim 12, wherein the power system comprises a wind turbine.

15. The power system of claim 12 wherein the damper comprises a plurality of dampers at different locations within the power system.

16. The power system of claim 12 wherein,
the sensor comprises a plurality of sensors configured for sensing signals at different locations within the power system,
the controller comprises one or more controllers configured for using the sensed signals for generating control signals for damping the electro-mechanical oscillations, and
the damper comprises a plurality of dampers at the different locations.

17. The stabilizer of claim 1 wherein the signal representative of electro-mechanical oscillations comprises an angular speed.

18. The stabilizer of claim 12 wherein the signal representative of electro-mechanical oscillations comprises an angular speed.

19. A power system stabilizer, the stabilizer comprising:
a sensor configured for sensing a signal representative of electro-mechanical oscillations of the power system;
a controller configured for using the sensed signal for generating control signals for damping the electro-mechanical oscillations; and
a damper comprising a damping converter and a resistor coupled to the damping converter, the damping converter being coupled to the power system through a power bus, the damping converter configured for using the control signals for damping the electro-mechanical oscillations;
wherein the damping converter comprises a diode rectifier coupled in parallel to a capacitor which in turn is coupled to an insulated gate bipolar transistor (IGBT) module;
wherein the damping converter comprises at least two IGBT modules;
wherein the stabilizer is further configured for providing voltage ride-through capability;
wherein the controller is configured for selectively switching IGBTs of the at least two IGBT modules simultaneously or sequentially.

* * * * *

UNITED STATES PATENT AND TRADEMARK OFFICE
Certificate

Patent No. 8,004,252 B2                                                      Patented: August 23, 2011

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Christof Martin Sihler, Hallbergmoos (DE); Alfredo Sebastian Achilles, Augsburg (DE); Simon Herbert Schramm, Munich (DE); and Bruce Gordon Norman, Burnt Hills, NY (US).

Signed and Sealed this Twelfth Day of March 2013.

TULSIDAS C. PATEL
*Supervisory Patent Examiner*
Art Unit 2833
Technology Center 2800